(12) United States Patent
Chen et al.

(10) Patent No.: US 12,444,114 B2
(45) Date of Patent: Oct. 14, 2025

(54) FACE MODEL EDITING SYSTEM AND FACE MODEL EDITING METHOD

(71) Applicant: ASUSTEK COMPUTER INC., Taipei (TW)

(72) Inventors: Kuan-Ling Chen, Taipei (TW); Yi-Hsuan Tsai, Taipei (TW); Jo-Hsuan Huang, Taipei (TW); Chieh-Han Chuang, Taipei (TW); Jun-Ting Chen, Taipei (TW); Shih-Hua Ma, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 245 days.

(21) Appl. No.: 18/084,971

(22) Filed: Dec. 20, 2022

(65) Prior Publication Data

US 2023/0401776 A1 Dec. 14, 2023

(30) Foreign Application Priority Data

Jun. 9, 2022 (CN) .......................... 202210650778.1

(51) Int. Cl.
*G06T 13/00* (2011.01)
*G06T 13/40* (2011.01)
(Continued)

(52) U.S. Cl.
CPC .............. *G06T 13/40* (2013.01); *G06T 19/20* (2013.01)

(58) Field of Classification Search
CPC ......... G06T 13/40; G06T 19/20; G06T 13/00; G06T 2219/2004; G06T 2219/2012; G06T 2219/2021; G06T 17/00
See application file for complete search history.

(56) References Cited

U.S. PATENT DOCUMENTS

| 11,217,036 B1* | 1/2022 | Albuz ..................... G06T 19/20 |
| 2014/0140624 A1* | 5/2014 | Kasahara ............. G06V 40/165 |
| | | 382/195 |

(Continued)

FOREIGN PATENT DOCUMENTS

| CN | 103606190 B | 5/2017 |
| CN | 110189404 A | 8/2019 |

(Continued)

*Primary Examiner* — Xiao M Wu
*Assistant Examiner* — George Renze
(74) *Attorney, Agent, or Firm* — Muncy, Geissler, Olds & Lowe, P.C.

(57) ABSTRACT

A face model editing method adapted to a face model editing system having a modeling platform and an editing platform is provided. The modeling platform has a plurality of face feature animation objects and a plurality of object parameters thereof. The face model editing method includes: receiving an object selection instruction by using the editing platform, and accessing the object parameter of the face feature animation object from the modeling platform according to the object selection instruction; receiving an adjusting instruction by using the editing platform, and adjusting the accessed object parameter; transmitting, by the editing platform, the adjusted object parameter to the modeling platform to update the object parameters; and generating, by the modeling platform, a three-dimensional face model by using the updated object parameters in combination with the face feature animation objects, and transmitting the three-dimensional face model to the editing platform for demonstration.

11 Claims, 10 Drawing Sheets

(51) Int. Cl.
  *G06T 17/00*   (2006.01)
  *G06T 19/20*   (2011.01)

(56) References Cited

U.S. PATENT DOCUMENTS

| | | | |
|---|---|---|---|
| 2018/0260994 A1* | 9/2018 | Li ............................ | G06T 13/40 |
| 2020/0001465 A1* | 1/2020 | Shin ......................... | B25J 9/163 |
| 2021/0005004 A1* | 1/2021 | Chandrasekaran ... | G06T 15/503 |
| 2021/0043000 A1* | 2/2021 | Chen ........................ | G06T 19/20 |
| 2021/0089759 A1* | 3/2021 | Todorov ................ | G06V 40/174 |

FOREIGN PATENT DOCUMENTS

| | | |
|---|---|---|
| CN | 110930499 A | 3/2020 |
| CN | 113724046 A | 11/2021 |

* cited by examiner

FACE MODEL EDITING SYSTEM AND FACE MODEL EDITING METHOD

CROSS-REFERENCE TO RELATED APPLICATION

This application claims the priority benefit of Chinese application serial No. 202210650778.1, filed on Jun. 9, 2022. The entirety of the above-mentioned patent application is hereby incorporated by reference herein and made a part of the specification.

BACKGROUND OF THE INVENTION

Field of the Invention

This application relates to the technical field of face modeling, and in particular, to a face model editing system and face model editing method.

Description of the Related Art

The production of face presentation on a robot is an important issue. For enterprises, different robot roles are required in different occasions, such as a friendly role in a bank and a professional appearance in a hospital, all of which need to be matched with different face designs.

In order to meet the needs of diverse face designs, some manufacturers have launched customized robot face platforms for users, but this method is limited to a two-dimensional face editing method, with delicacy and vividness less than satisfaction.

BRIEF SUMMARY OF THE INVENTION

This application provides a face model editing method. The face model editing method is adapted to a face model editing system. The face model editing method includes a modeling platform and an editing platform, where the modeling platform has a plurality of face feature animation objects and a plurality of object parameters corresponding to the plurality of face feature animation objects. The face model editing method includes: receiving an object selection instruction by using the editing platform, and accessing the object parameter of the face feature animation object corresponding to the object selection instruction from the modeling platform according to the object selection instruction; receiving an adjusting instruction by using the editing platform, and adjusting, according to the adjusting instruction, the object parameter of the face feature animation object corresponding to the object selection instruction; transmitting, by the editing platform, the adjusted object parameter to the modeling platform to update the object parameters; generating, by the modeling platform, a three-dimensional face model by using the updated object parameters in combination with the face feature animation objects; and transmitting, by the modeling platform, the three-dimensional face model to the editing platform for demonstration.

This application provides a face model editing system. The face model editing system includes: a modeling platform and an editing platform. The modeling platform has a plurality of face feature animation objects and a plurality of object parameters corresponding to the plurality of face feature animation objects. The editing platform communicates with the modeling platform through a network to receive an object selection instruction and an adjusting instruction, where the editing platform accesses the object parameter of the face feature animation object corresponding to the object selection instruction from the modeling platform according to the object selection instruction, adjusts the accessed object parameter according to the adjusting instruction, and transmits the adjusted object parameter to the modeling platform to update the object parameters. The modeling platform generates a three-dimensional face model by using the updated object parameters in combination with the face feature animation objects, and transmits the three-dimensional face model to the editing platform for demonstration.

Through the face model editing system and the face model editing method provided in this application, an editing platform is provided for a user to edit object parameters, and then a modeling platform generates a three-dimensional face model according to updated object parameters in combination with face feature animation objects. In this way, in addition to meeting the needs of diverse face designs, the edited three-dimensional face model also helps to enhance the delicacy and vividness of the face model.

DETAILED DESCRIPTION OF THE EMBODIMENTS

Specific implementations of this application will be described in detail below with reference to the schematic diagrams. According to the following description and the scope of patent application, advantages and characteristics of this application will be clearer. It is to be noted that, the diagrams are in a simplified form and use imprecise proportions, which are only used to help illustrate the purpose of the embodiments of this application conveniently and clearly.

Figure 1:
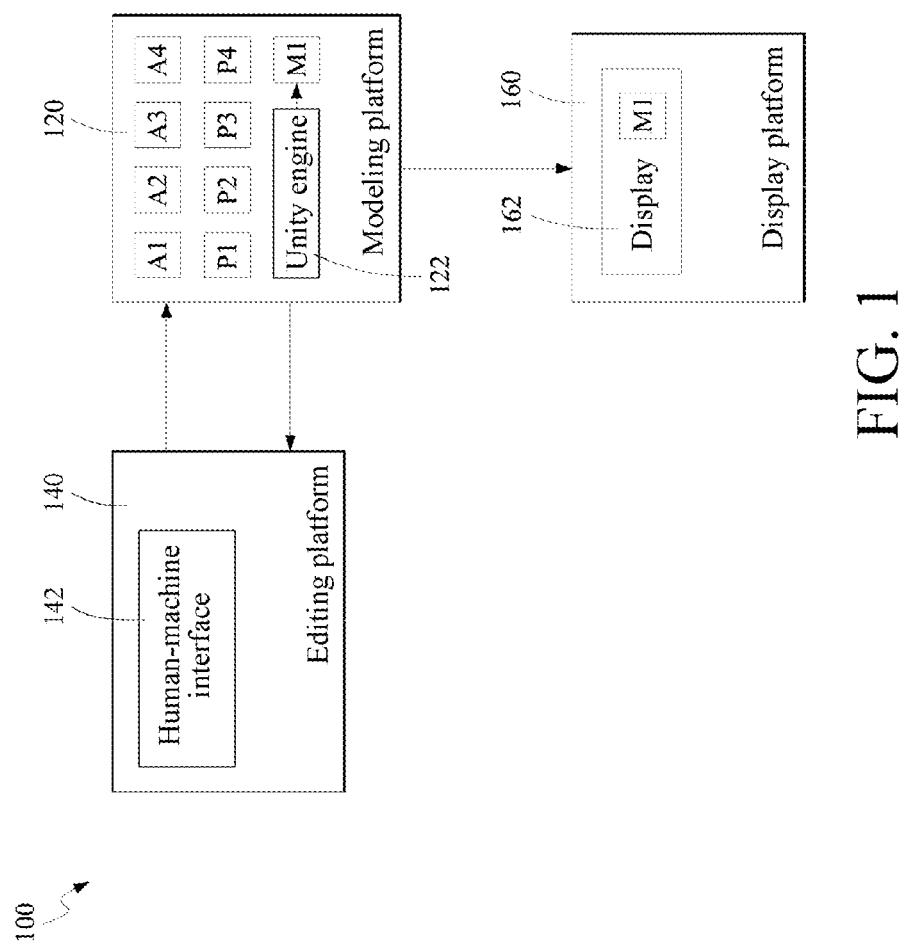
FIG. 1 is a block diagram of a face model editing system according to an embodiment of this application.

FIG. 1 is a block diagram of a face model editing system 100 according to an embodiment of this application. As shown in the figure, the face model editing system 100 includes: a modeling platform 120, an editing platform 140 and a display platform 160.

The modeling platform 120 has a plurality of face feature animation objects A1, A2, A3, A4, and a plurality of object parameters P1, P2, P3, P4 corresponding to the plurality of face feature animation objects A1, A2, A3, A4. The figure shows four face feature animation objects A1, A2, A3, A4 and four corresponding object parameters P1, P2, P3, P4 as an example to facilitate the description of this application. The modeling platform generates a three-dimensional face model M1 by using the object parameters P1, P2, P3, P4 in combination with the face feature animation objects A1, A2, A3, A4.

In an embodiment, the modeling platform 120 has a unity engine 122, where the unity engine 122 controls an attribute of the three-dimensional model by using the object parameters P1, P2, P3, P4 to demonstrate the three-dimensional face model M1. In an embodiment, the modeling platform 120 is set up on a server.

The editing platform 140 communicates with the modeling platform 120 through a network, and has a human-machine interface 142. The editing platform 140 receives an object selection instruction S1, an adjusting instruction S2, an export instruction S3 and an import instruction S4 through the human-machine interface 142, referring FIG. 2A to FIG. 2C for details. In an embodiment, the editing platform 140 is set up on an electronic device having the human-machine interface 142, such as a portable electronic device. In an embodiment, the human-machine interface 142 is set up on a web browser.

The display platform 160 has a display 162. The display platform 160 communicates with the modeling platform 120 through the network to receive the foregoing three-dimensional face model M1, and demonstrates the three-dimensional face model M1 on the display 162. In an embodiment, the display platform 160 is a robot or another electronic device having the display 162 for interaction. Besides, in an embodiment, the foregoing editing platform 140 and the display platform 160 are integrated.

Compared with the editing platform 140 that displays the three-dimensional face model M1 for a user to preview during editing, a main purpose of the display platform 160 is to present an edited three-dimensional face model M1. Because the editing platform 140 also has a display function, in one embodiment, the face model editing system 100 omits the display platform 160. In other embodiments, the editing platform 140 and the display platform 160 are integrated.

Figure 2A:
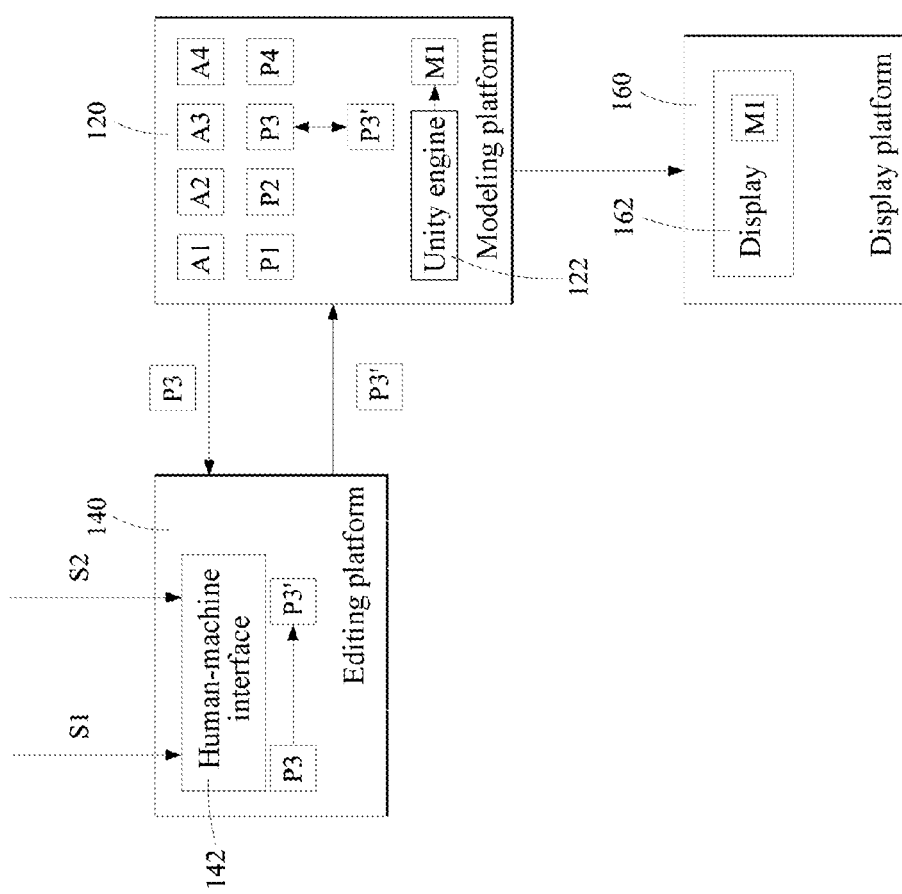
FIG. 2A shows an operation performed by the face model editing system in this application after an editing platform receives an object selection instruction.
Figure 2B:
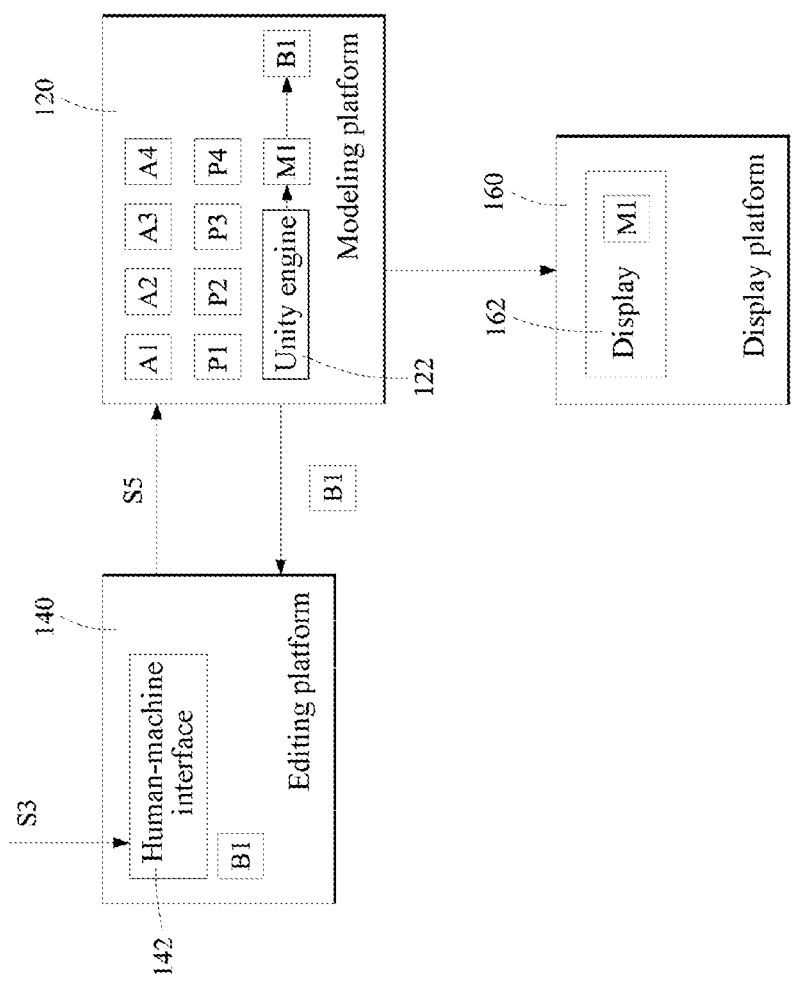
FIG. 2B shows an operation performed by the face model editing system in this application after the editing platform receives an export instruction.
Figure 2C:
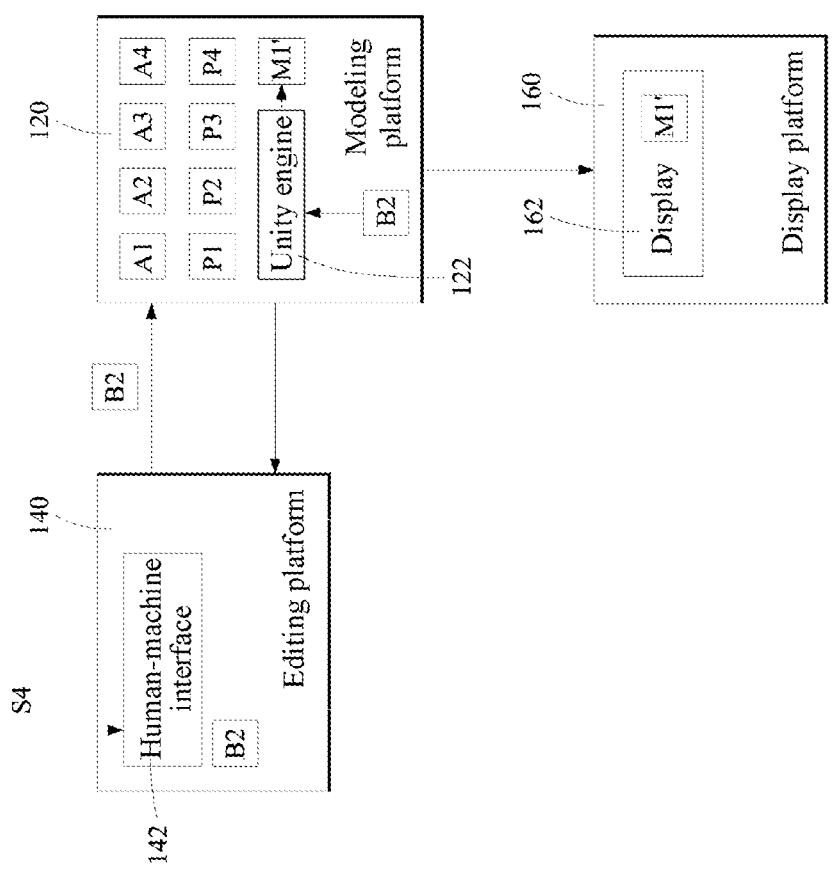
FIG. 2C shows an operation performed by the face model editing system in this application after the editing platform receives an import instruction.

Referring to FIG. 2A and FIG. 2C also, FIG. 2A shows an operation performed by the face model editing system 100 after the editing platform 140 receives the object selection instruction S1, FIG. 2B shows an operation performed by the face model editing system 100 after the editing platform 140 receives the export instruction S3, and FIG. 2C shows an operation performed by the face model editing system 100 after the editing platform 140 receives the import instruction S4.

Referring to FIG. 2A, after receiving the object selection instruction S1, the editing platform 140 is connected to the modeling platform 120 to access the object parameter of a face feature animation object corresponding to the object selection instruction S1, such as the object parameter P3 in the figure, and presents the face feature animation object A3 and the object parameter P3 on the human-machine interface 142 for the user to edit.

After the user confirms adjustment content and inputs the content through the human-machine interface 142, the editing platform 140 receives an adjusting instruction S2. The editing platform 140 then adjusts the object parameter P3 of the face feature animation object A3 according to the adjusting instruction S2, and transmits the adjusted object parameter P3' to the modeling platform 120 to update the object parameters P1, P2, P3, P4 of the modeling platform 120, thereby changing an attribute of the three-dimensional face model M1.

In an embodiment, each of the object parameters P1, P2, P3, P4 includes at least one of a location parameter, a dimension parameter, and a color parameter. In an embodiment, the foregoing location parameter and the dimension parameter are two-dimensional parameters, so that the user edits the face model more easily. Besides, the type and number of parameters of each object parameter P1, P2, P3, P4 are different according to different properties of each face feature animation object A1, A2, A3, A4.

Afterwards, the modeling platform 120 generates an updated three-dimensional face model M1' by using the object parameters P1, P2, P3', P4 in combination with the face feature animation objects A1, A2, A3, A4, and transmits the three-dimensional face model M1' to the editing platform 140 for the user to preview an editing result. According to an actual need, the foregoing adjusting instruction S2 is to adjust the object parameter P3 of the single face feature animation object A3, or to adjust the object parameters P1, P2, P3, P4 of the plurality of face feature animation objects A1, A2, A3, A4 at one time.

Referring to FIG. 2B, after receiving the export instruction S3, the editing platform 140 generates an export signal S5 according to the export instruction S3t, to notify the modeling platform 120. After receiving the export signal S5, the modeling platform 120 generates a screenshot B1 by using the three-dimensional face model M1, and transmits the screenshot B1 back to the editing platform 140. The user performs editing directly through the editing platform 140, or downloads the screenshot B1 and then uses other electronic devices for editing. In an embodiment, the screenshot B1 is a two-dimensional diagram.

Referring to FIG. 2C, after receiving the import instruction S4, the editing platform 140 uploads a customized animation object B2 provided by the user to the modeling platform 120 according to the import instruction S4. The modeling platform 120 converts the customized animation object B2 into a two-dimensional diagram, and combines the two-dimensional diagram with the three-dimensional face model M1. In an embodiment, the modeling platform 120 converts the customized animation object B2 into a UV map, and combines the UV map with the three-dimensional face model M1 through UV mapping. The modeling platform 120 transmits a three-dimensional face model M1" combined with the UV map to the editing platform 140 for demonstration, for the user to preview. In an embodiment, the foregoing customized animation object B2 replaces one of the face feature animation objects A1, A2, A3, A4 of the modeling platform 120.

Figure 3:
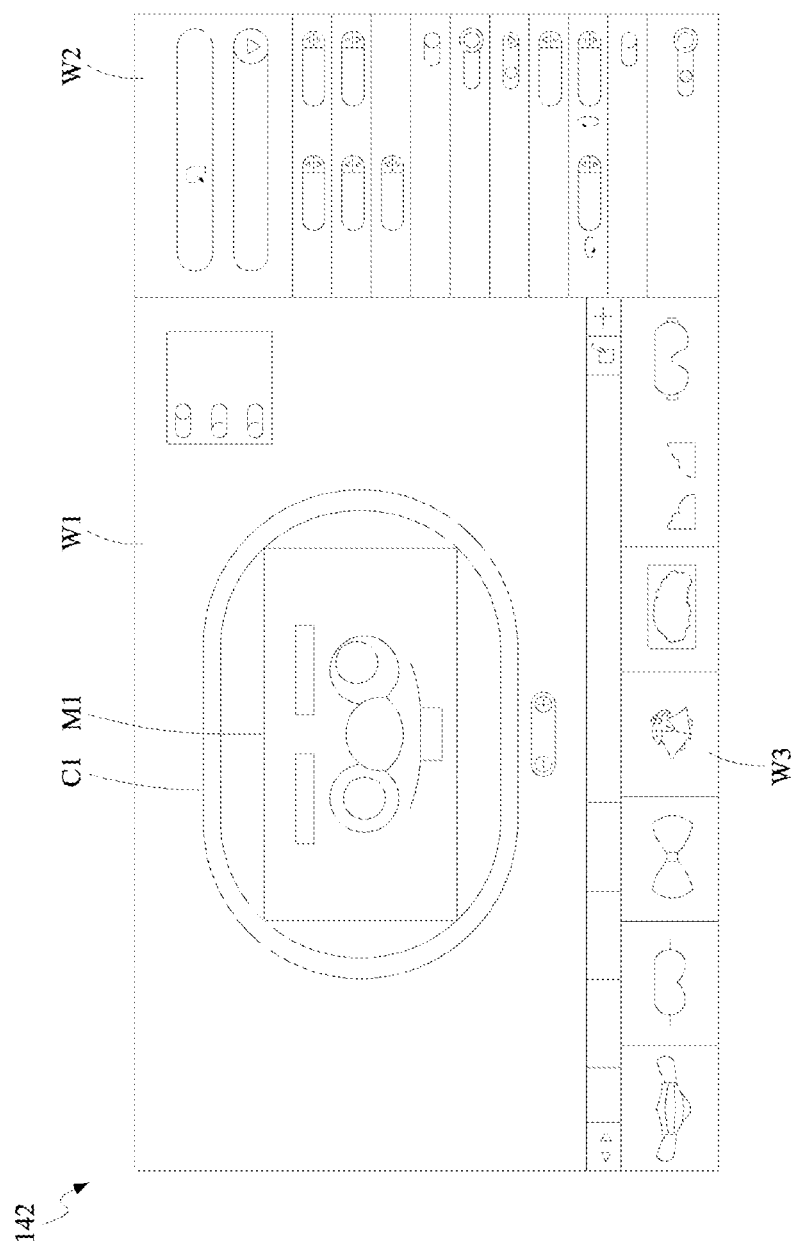
FIG. 3 is a schematic diagram of an embodiment of a human-machine interface of the face model editing system in FIG. 1.

Referring to FIG. 1 and FIG. 3, FIG. 3 is a schematic diagram of an embodiment of the human-machine interface 142 of the face model editing system 100 in FIG. 1.

As shown in the figure, the human-machine interface 142 includes a preview window W1, an adjusting window W2 and a fitting window W3. The adjusting window W2 presents all adjustable parameters corresponding to a specific face feature animation object for the user to adjust. The figure shows adjustment for the right eye. In an embodiment, the user adjusts locations or sizes of the eyeball, the white of the eye and the eyelid of the right eye in a touch method through the human-machine interface 142. The fitting window W3 presents a variety of different fittings, to allow the user to select a fitting to be attached to the three-dimensional face model M1. The preview window W1 provides a preview function to instantly present the three-dimensional face model M1 after parameter adjustment. In an embodiment, as shown in the figure, the preview window W1 has a simulation display C1 on which the three-dimensional face model M1 is presented to simulate a visual effect of actual presentation on the display platform 160.

Figure 4A:
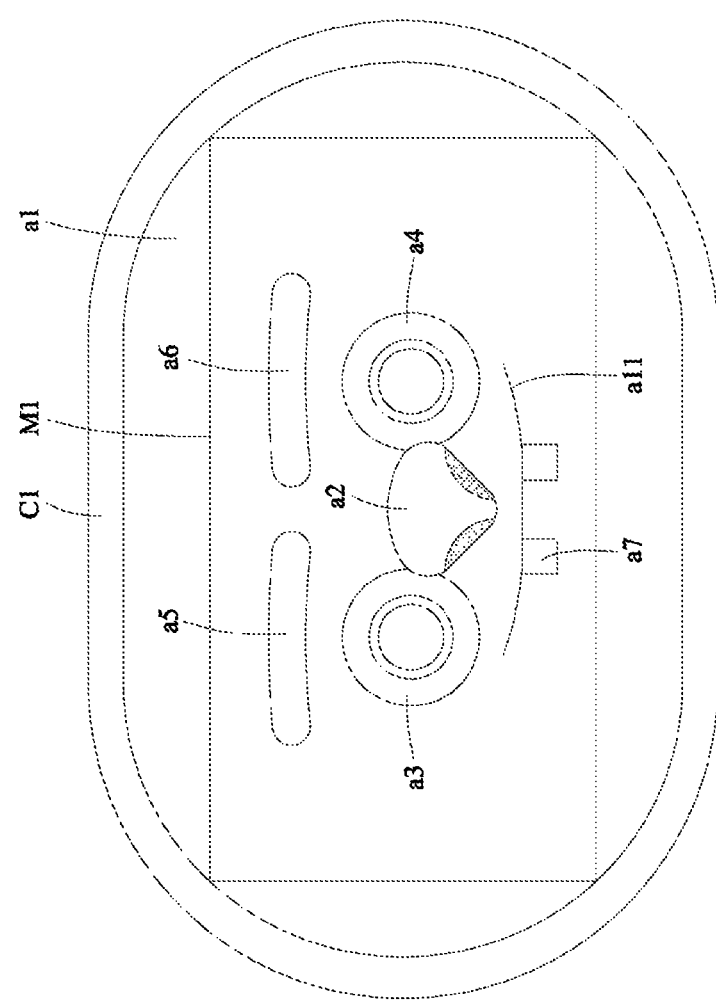
FIG. 4A and FIG. 4B are a schematic front view and a schematic side view of an embodiment of a three-dimensional face model established by a modeling platform in FIG. 1.
Figure 4B:
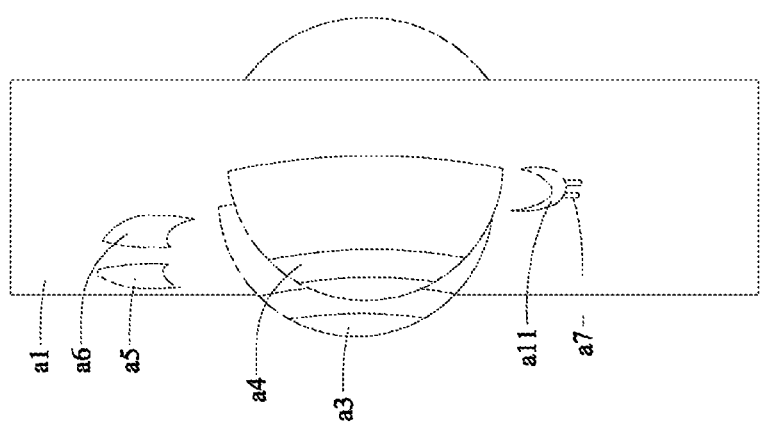

Referring to FIG. 4A and FIG. 4B, FIG. 4A and the FIG. 4B are a schematic front view and a schematic side view of an embodiment of the three-dimensional face model M1 established by the modeling platform 120 in FIG. 1.

As shown in the figure, the three-dimensional face model M1 includes a plurality of two-dimensional face feature animation objects and at least a three-dimensional face feature animation object. In an embodiment, the three-dimensional face model M1 includes a base face a1, a nose a2, two eyes a3 and a4, and two eyebrows a5 and a6.

In the face feature animation objects, the two eyes a3 and a4 show a deep visual sense in the schematic side view. The two eyes a3 and a4 are three-dimensional face feature animation objects, and the others are two-dimensional face feature animation objects. Compared with the two-dimensional face feature animation object, the three-dimensional face feature animation object adds the depth, improving the delicacy of the face model. Besides, because the eyes a3 and a4 are often the first positions that attract attention of people, presenting the eyes a3 and a4 in the three-dimensional face model M1 by using the three-dimensional face feature animation objects generates a more vivid visual effect.

In the two-dimensional face feature animation objects, a periphery of the base face a1 is fixed, and the size of the base face a1 (such as a length-width ratio) corresponds to the size of the display 162. The base face a1 also has a mouth a11, and a location, shape and size of the mouth a11 are adjustable through the object parameter. In an embodiment, the three-dimensional face model M1 further includes teeth a7, where the object parameter corresponding to the teeth a7 is linked to the mouth a11, so that the teeth a7 are adjacent to the mouth a11.

In an embodiment, to achieve a three-dimensional visual sense of the two-dimensional face feature animation object presents, arc lines or shadows are added to the two-dimensional face feature animation objects. In an embodiment, although the nose a2 is a two-dimensional face feature animation object, the user feels a three-dimensional visual sense in the schematic front view through the arc lines and shadows.

Figure 5:
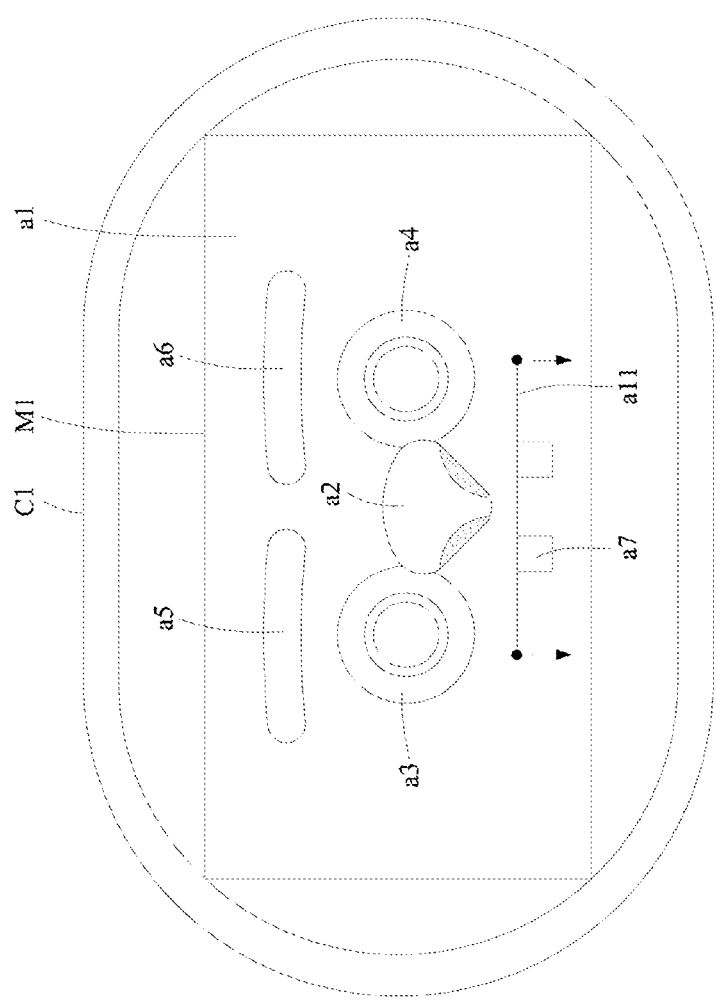
FIG. 5 is a schematic diagram of an embodiment in which the modeling platform in FIG. 1 changes an attribute of the three-dimensional face model by adjusting an object parameter.

Referring to FIG. 5, FIG. 5 is a schematic diagram of an embodiment in which the modeling platform 120 in FIG. 1 changes an attribute of the three-dimensional face model M1 by adjusting the object parameter.

In this embodiment, the shape of the mouth a11 of the base face a1 is changed by adjusting the object parameter. As shown in the figure, during adjustment of the mouth a11, the periphery of the face a1 does not change accordingly. In this way, it is ensured that the three-dimensional face model M1 generated by the modeling platform 120 is properly presented on the display platform 160.

Figure 6:
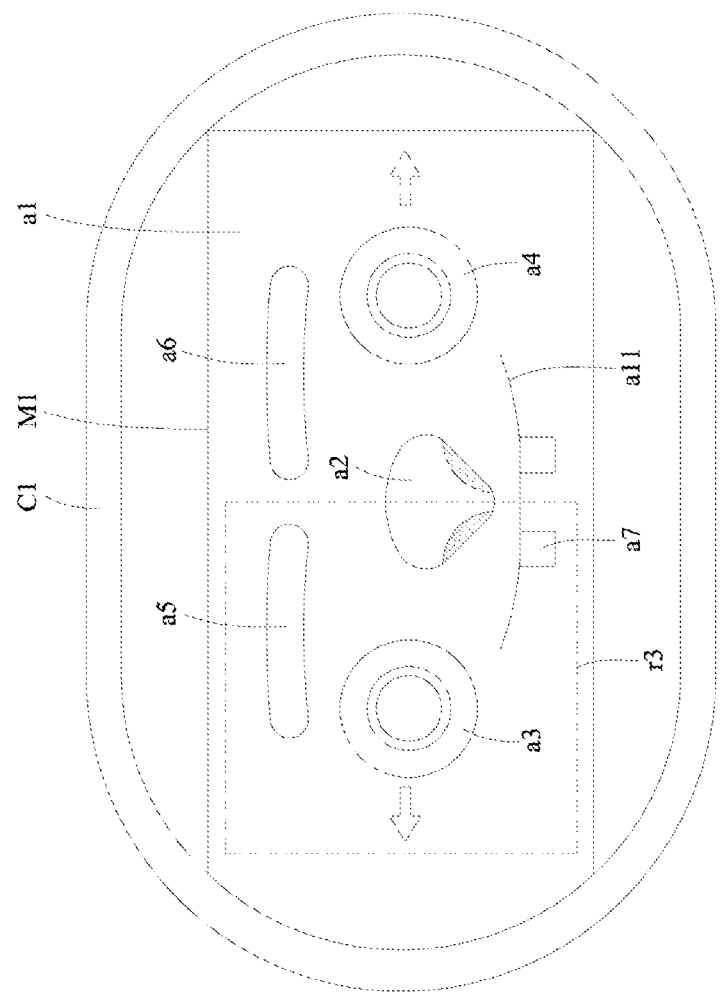
FIG. 6 is a schematic diagram of another embodiment in which the modeling platform of the FIG. 1 changes an attribute of the three-dimensional face model by adjusting an object parameter.

Referring to FIG. 6, FIG. 6 is a schematic diagram of another embodiment in which the modeling platform 120 in FIG. 1 changes an attribute of the three-dimensional face model M1 by adjusting the object parameter.

In this embodiment, the location of the eye a3 is changed by adjusting the object parameter. As shown in the figure, during adjustment of the location parameter of one eye a3 (shown by a solid arrow in the figure), the location of the other eye a4 is also adjusted accordingly (shown by a dotted arrow in the figure). In other words, the location parameter in the object parameter of the other eye a4 is adjusted synchronously. In an embodiment, as shown in the figure, the locations of the two eyes a3 and a4 are adjusted synchronously with a center line of the base face a1 as a center of symmetry. In an embodiment, the locations of the two eyes a3 and a4 are adjusted synchronously towards a same direction.

The eyes a3 and a4 each correspond to an eye location adjustment range (the range indicated by the dotted box in the figure is the eye location adjustment range r3 corresponding to the eye a3). The eye location adjustment range r3 corresponds to the periphery of the base face a1 to prevent the eye a3 from moving outside the base face a1. In an embodiment, as shown in the figure, in order to avoid excessive deviation of the eye a3 from the center line of the base face a1 to affect overall presentation of the three-dimensional face model M1, the eye location adjustment range r3 of the eye a3 is between a margin of the base face a1 on a same side as the eye a3 and the center line of the base face a1. However, it is not limited thereto. In other embodiments, the eye location adjustment range r3 of the eye a3 is between the margin of the base face a1 on the same side as the eye a3 and the eye a4 on the other side.

Similar to the eyes a3 and a4, in one embodiment, the object parameters of the two eyebrows a5 and a6 are adjusted synchronously, and each eyebrow a5, a6 corresponds to an eyebrow location adjustment range corresponding to the periphery of the base face a1.

Similar to the eyes a3 and a4, the nose a2 corresponds to a nose location adjustment range. The nose location adjustment range corresponds to the periphery of the base face a1. Besides, in an embodiment, the nose location adjustment range is defined based on the locations of the two eyes a3 and a4 and the location of the mouth a11.

Figure 7:
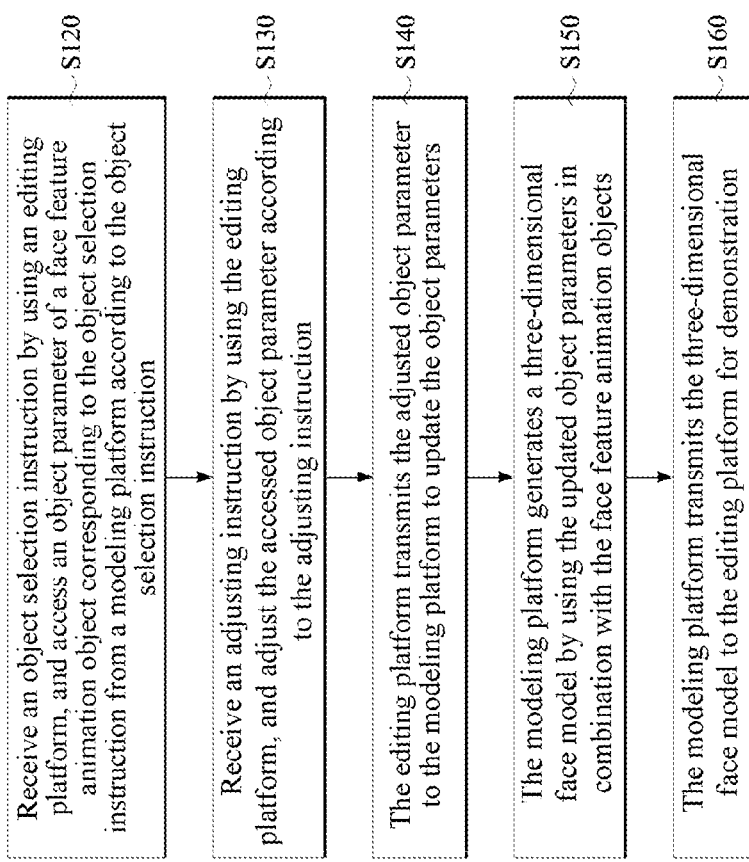
FIG. 7 is a flowchart of a face model editing method according to an embodiment of this application.

FIG. 7 is a flowchart of a face model editing method according to an embodiment of this application. The face model editing method is adapted to the face model editing system 100 shown in FIG. 1. The face model editing method includes the following steps.

Referring to FIG. 3 also, first, as described in step S120, an object selection instruction S1 is received by using the editing platform 140, and an object parameter P3 of the face feature animation object A3 corresponding to the object selection instruction S1 is accessed from the modeling platform 120 according to the object selection instruction S1. The object selection instruction S1 is used to select one of a plurality of face feature animation objects A1, A2, A3, A4 of the modeling platform 120, to perform the following parameter editing steps. Step S120 is performed jointly by the editing platform 140 and the modeling platform 120.

Afterwards, as described in step S130, an adjusting instruction S2 is received by using the editing platform 140, and the accessed object parameter P3 is adjusted according to the adjusting instruction S2. Step S130 is performed by the editing platform 140.

Then, as described in step S140, the editing platform 140 transmits the adjusted object parameter P3' to the modeling platform 120 to update the object parameters P1, P2, P3, P4. Step S140 is performed jointly by the editing platform 140 and the modeling platform 120.

After that, as described in step S150, the modeling platform 120 generates a three-dimensional face model M1' by using the updated object parameters P1, P2, P3', P4 in combination with the face feature animation objects A1, A2, A3, A4. Step S150 is performed by the modeling platform 120.

Then, as described in step S160, the modeling platform 120 transmits the three-dimensional face model M1' to the editing platform 140 for demonstration. Step S160 is performed jointly by the editing platform 140 and the modeling platform 120.

Through the face model editing system 100 and the face model editing method provided in this application, an editing platform 140 is provided for a user to edit object parameters P1, P2, P3, P4, and then a modeling platform 120 generates a three-dimensional face model M1 by using the updated object parameter P1, P2, P3, P4 in combination with face feature animation objects A1, A2, A3, A4. In this way, in addition to meeting the needs of diverse face designs, the edited three-dimensional face model M1 also helps to enhance the delicacy and vividness of the face model.

The foregoing are only preferred embodiments of this application, and are not intended to limit this application. Any form of equivalent replacement or modification made on the technical means and technical contents disclosed in this application by any person skilled in the art without departing from the scope of the technical means of this application belongs to the content of the technical means of this application and still falls within the scope of protection of this application.

What is claimed is:

1. A face model editing method adapted to a face model editing system having a modeling platform and an editing platform, wherein the modeling platform has a plurality of face feature animation objects and a plurality of object parameters corresponding to the plurality of face feature animation objects, the face model editing method comprising:
   receiving an object selection instruction by using the editing platform, and accessing the object parameter of the face feature animation object corresponding to the object selection instruction from the modeling platform according to the object selection instruction;
   receiving an adjusting instruction by using the editing platform and adjusting the accessed object parameter according to the adjusting instruction;
   transmitting, by the editing platform, the adjusted object parameter to the modeling platform to update the object parameters;
   generating, by the modeling platform, a three-dimensional face model according to the updated object parameters in combination with the face feature animation objects; and
   transmitting the three-dimensional face model to the editing platform for demonstration,
   wherein the face feature animation objects comprise a plurality of two-dimensional face feature animation objects and at least one three-dimensional face feature animation object,
   wherein the face model editing method further comprises:
      receiving an import instruction by using the editing platform and transmitting a customized animation object to the modeling platform according to the import instruction; and
      converting, by the modeling platform, the customized animation object into a two-dimensional diagram, and combining the two-dimensional diagram with the three-dimensional face model, and
   wherein the two-dimensional diagram is a UV map.

2. The face model editing method according to claim 1, wherein the object parameter comprises at least one of a location parameter, a dimension parameter and a color parameter.

3. The face model editing method according to claim 1, wherein the three-dimensional face feature animation object is an eye.

4. The face model editing method according to claim 1, wherein the face feature animation objects comprise: a base face, a nose, two eyes and two eyebrows, the base face comprises a mouth, and the base face has a fixed periphery.

5. The face model editing method according to claim 4, wherein the object parameters of the two eyes are adjusted synchronously.

6. The face model editing method according to claim 4, wherein the face feature animation objects further comprise teeth, the teeth are adjacent to the mouth.

7. The face model editing method according to claim 1, wherein the customized animation object is used to replace one of the face feature animation objects.

8. The face model editing method according to claim 1, further comprising:
   receiving an export instruction by using the editing platform to generate an export signal and to transmit the export signal to the modeling platform; and
   generating, by the modeling platform, a screenshot by using the three-dimensional face model after receiving the export signal, and transmitting the screenshot to the editing platform.

9. A face model editing system, comprising:
   a modeling platform, having a plurality of face feature animation objects and a plurality of object parameters corresponding to the plurality of face feature animation objects;
   an editing platform, communicating with the modeling platform through a network to receive an object selection instruction and an adjusting instruction, wherein the editing platform accesses the object parameter of the face feature animation object corresponding to the object selection instruction from the modeling platform according to the object selection instruction, adjusts the accessed object parameter according to the adjusting instruction, and transmits the adjusted object parameter to the modeling platform to update the object parameters;
   wherein the modeling platform generates a three-dimensional face model by using the updated object parameters in combination with the face feature animation objects, and transmits the three-dimensional face model to the editing platform for demonstration,
   wherein the editing platform receives an import instruction and transmits a customized animation object to the modeling platform according to the import instruction,
   wherein the modeling platform converts the customized animation object into a two-dimensional diagram, and combines the two-dimensional diagram with the three-dimensional face model, the two-dimensional diagram being a UV map, and
   wherein the face feature animation objects comprise a plurality of two-dimensional face feature animation objects and at least one three-dimensional face feature animation object.

10. The face model editing system according to claim 9, wherein the editing platform has a human-machine interface to receive the object selection instruction and the adjusting instruction, and the human-machine interface is constructed on a web browser.

11. The face model editing system according to claim 9, further comprising: a display platform having a display, wherein the display platform communicates with the modeling platform through the network to receive the three-dimensional face model and demonstrates the three-dimensional face model on the display.

\* \* \* \* \*